J. Magoun,
Glass Mold.
Nº 5,875.  Patented Oct. 24, 1848.
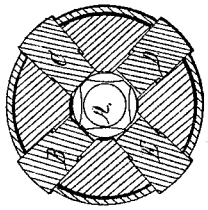
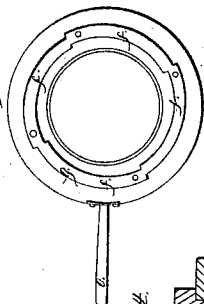
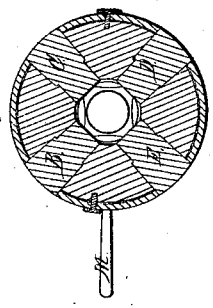
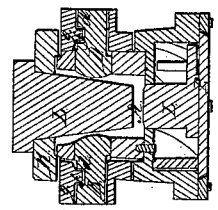
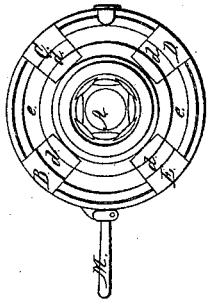
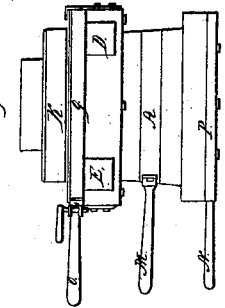
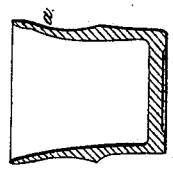
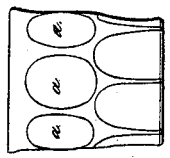

UNITED STATES PATENT OFFICE.

JOS. MAGOUN, OF CAMBRIDGE, MASSACHUSETTS, ASSIGNOR TO NEW ENGLAND GLASS CO.

MOLDING GLASS.

Specification of Letters Patent No. 5,875, dated October 24, 1848.

*To all whom it may concern:*

Be it known that I, JOSEPH MAGOUN, of Cambridge, in the county of Middlesex and State of Massachusetts, have invented a new and useful improvement in molds for pressing or shaping glass articles, having on their external surfaces such ornaments in incavo, intaglio, or basso-relievo as would prevent their being withdrawn from the mold unless said mold be provided with my improvement substantially as hereinafter explained; and I do hereby declare that my said invention is fully described and represented in the following specification and accompanying drawings, letters, figures, and references thereof.

Of said drawings Figure 1 denotes an elevation of a glass tumbler, made with a row of elliptical indentations $a$, $a$, &c., disposed above the usual flutes $b$, $b$, &c., which in this case are made somewhat shorter than usual. Fig. 2, is a vertical and central section of said tumbler. I present this as a plain specimen of the glass articles to the casting of which my improvement is peculiarly applicable. Fig. 3, exhibits a side elevation of my improved mold. Fig. 8, is a horizontal section of it taken through the lateral incavo pistons or retracting portions. Fig. 4, is a central and vertical section of the said mold taken through two opposite retracting portions. Fig. 5, is a top view of the incavo pistons, and circular groove, upon and in connection with which the cam plate operates. Fig. 6, is an underside view of said cam plate, as removed from the mold.

My mold is made in every respect like common fluted tumbler molds, except that it is provided with a series of retracting pistons or parts. That is to say, I make each part of the mold surface that projects inward (or forms the incavo ornaments or depressions of the exterior surface of the tumbler) and would otherwise prevent the withdrawal of the glass article from the mold, retractable or movable in such manner as to enable the glass founder to remove it beyond other or stationary parts of the mold surface, to the extent necessary to admit of the removal or withdrawal of the glass article from the matrix or mold.

It is to be understood that my invention is particularly applicable to such molds as do not open in two parts or halves, and which do not produce the "mold marks" or impressions of the usual side seam or seams. I do not however confine it to such, as it may be often used to advantage in other molds.

In the drawings A denotes the matrix of the mold.

B, C, D, E, are the retractable pistons, whose inner ends are formed convex, or shaped so as to produce the elliptical indents or concave impressions $a$, $a$, &c. Each of said pistons has a groove $d$, made across it as seen in Fig. 5, and in the direction of a circular and wider groove $e$ made in the mold so as to receive the cams $f$, $f$, $f$, $f$, which project from a plate $g$, and respectively enter the grooves $d$, $d$, &c., of the several pistons. The said cams are so formed as not only to cause the pistons to fall back when the plate $g$, and cams are partially rotated in one direction, but to cause them (the said pistons) to advance into their previous positions, when the plate and cams are turned back or partially rotated in the opposite direction.

Fig. 7 represents a horizontal section of the mold taken through the pistons, and exhibiting them as retracted or drawn back to the degree sufficient to enable the elevator I, when raised to discharge the tumbler or glass article from the mold.

K, denotes the cap plate of the mold, and L, the plunger thereof, M, is the stationary handle to hold the mold by, when the workman applies his hand to either of the handles, N, or O, the former of which is attached to the cam plate P, of the elevator while the latter projects from the cam plate of the pistons.

Although I have represented my invention under a certain form or arrangement yet I do not confine the same thereto but mean to vary the same to such extent and manner as circumstances may require, while I do not change the nature of it.

What I claim as new, is one or more lateral movable or retractive parts or pistons B, C, D, E, as combined with the remainder of the matrix or stationary part of the mold, and made to operate therewith substantially in manner and for the purpose as hereinbefore specified.

In testimony whereof I have hereto set my signature this fourth day of November, A. D. 1847.

JOSEPH MAGOUN.

Witnesses:
R. H. EDDY,
JOHN LISCOM.